US006711872B2

(12) United States Patent
Anderson

(10) Patent No.: US 6,711,872 B2
(45) Date of Patent: Mar. 30, 2004

(54) LIGHTWEIGHT PANEL CONSTRUCTION

(75) Inventor: D. W. Anderson, Middletown, NY (US)

(73) Assignee: International Paper Company, Tuxedo, NY (US)

( * ) Notice: Subject to any disclaimer, the term of this patent is extended or adjusted under 35 U.S.C. 154(b) by 0 days.

(21) Appl. No.: 09/916,307

(22) Filed: Jul. 30, 2001

(65) Prior Publication Data
US 2003/0019176 A1 Jan. 30, 2003

(51) Int. Cl.[7] .............................................. E04C 2/32
(52) U.S. Cl. ................................ 52/783.17; 52/783.19
(58) Field of Search ........................ 52/309.9, 783.17, 52/783.11, 784.14, 783.13, 783.14, 783.15, 783.1, 783.19

(56) References Cited

U.S. PATENT DOCUMENTS

| 1,625,061 A | * | 4/1927 | Trout |
| 2,973,295 A | | 2/1961 | Rodgers ...................... 154/100 |
| 3,106,503 A | * | 10/1963 | Randall et al. ............. 156/290 |
| 3,170,827 A | | 2/1965 | Voelker ........................ 156/78 |
| 3,192,099 A | | 6/1965 | Beckman ...................... 161/43 |
| 3,246,058 A | | 4/1966 | Voelker ........................ 264/47 |
| 3,249,659 A | | 5/1966 | Voelker ........................ 264/47 |
| 3,445,322 A | | 5/1969 | Saiia .......................... 161/113 |
| 3,497,409 A | | 2/1970 | Clem .......................... 156/213 |
| 3,616,590 A | | 11/1971 | Shotmeyer .................... 52/663 |
| 3,755,038 A | | 8/1973 | Atteck ........................ 156/197 |
| 3,787,276 A | | 1/1974 | Jacquelin .................... 161/137 |
| 3,905,443 A | * | 9/1975 | Sieuzac ....................... 181/291 |
| 3,998,024 A | | 12/1976 | Frandsen ..................... 52/595 |
| 4,048,373 A | | 9/1977 | Clem .......................... 428/454 |
| 4,150,850 A | | 4/1979 | Doerfling .................... 296/137 |
| 4,162,341 A | * | 7/1979 | Norton ................... 220/560.15 |
| 4,351,870 A | | 9/1982 | English ....................... 428/174 |
| 4,602,466 A | * | 7/1986 | Larson ........................ 156/79 |
| 4,603,531 A | * | 8/1986 | Nash .......................... 428/116 |
| 4,736,566 A | * | 4/1988 | Krotsch ........................ 52/674 |
| 4,861,642 A | | 8/1989 | Stagg ......................... 428/139 |
| 4,877,671 A | | 10/1989 | Stagg ......................... 428/139 |
| 4,917,742 A | | 4/1990 | Yasuhiko ...................... 156/79 |
| 5,063,100 A | | 11/1991 | Alexander ................... 428/137 |
| 5,128,195 A | * | 7/1992 | Hegedus ...................... 428/116 |
| 5,288,538 A | | 2/1994 | Spears ........................ 428/116 |
| 5,309,690 A | | 5/1994 | Symons ....................... 52/309.9 |
| 5,338,594 A | | 8/1994 | Wang ......................... 428/117 |
| 5,373,674 A | * | 12/1994 | Winter, IV ................. 52/309.9 |
| 5,518,796 A | * | 5/1996 | Tsotsis ....................... 428/116 |
| 5,543,204 A | * | 8/1996 | Ray ........................... 156/205 |
| 5,545,458 A | | 8/1996 | Fukushima ................... 428/117 |
| 5,679,433 A | | 10/1997 | Hayashi ...................... 428/116 |
| 5,753,340 A | | 5/1998 | Welch ........................ 428/117 |
| 5,776,579 A | | 7/1998 | Jessup ........................ 428/73 |
| 5,888,612 A | | 3/1999 | Needham ..................... 428/116 |
| 6,061,993 A | * | 5/2000 | Bendixen et al. ........... 428/117 |

FOREIGN PATENT DOCUMENTS

GB            1080369       *  8/1967

* cited by examiner

Primary Examiner—Ramon O. Ramirez
Assistant Examiner—Jon Szumny
(74) Attorney, Agent, or Firm—Dennis H. Lambert

(57) ABSTRACT

A lightweight panel construction in which a thin layer or veneer of gypsum board is laminated as a facing sheet onto a backing of lightweight open cell reinforcing material to form a composite panel that has the same surface characteristics and appearance as a sheet of conventional gypsum board and is suitable as a lightweight but strong substitute for conventional gypsum board. Portions of the open cell reinforcing material may be removed or omitted to form raceways or channels for utilities or the like.

14 Claims, 4 Drawing Sheets

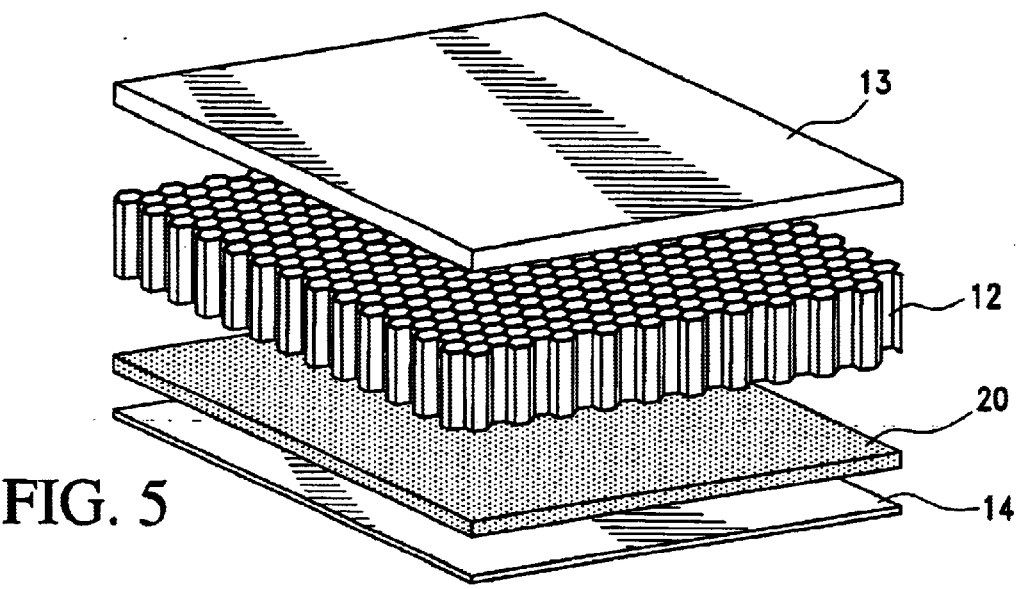
FIG. 5
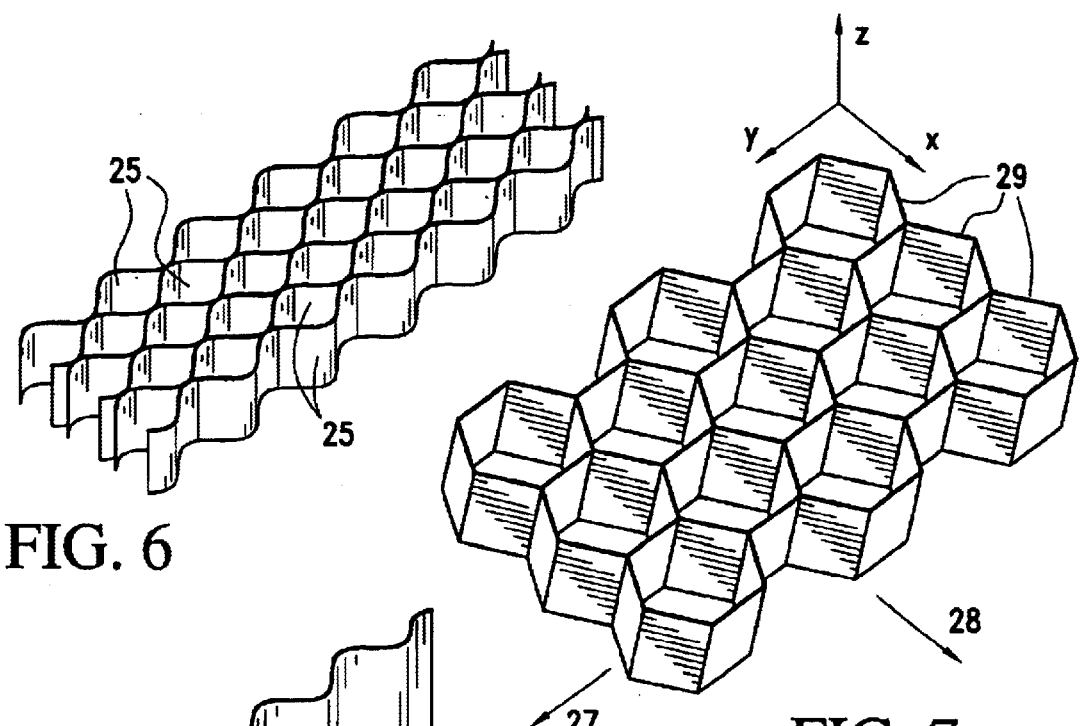
FIG. 6
FIG. 7
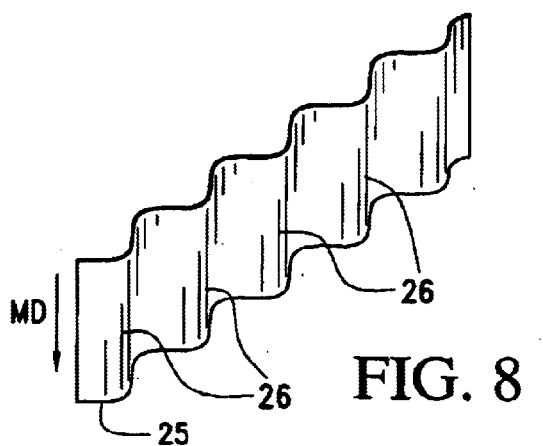
FIG. 8

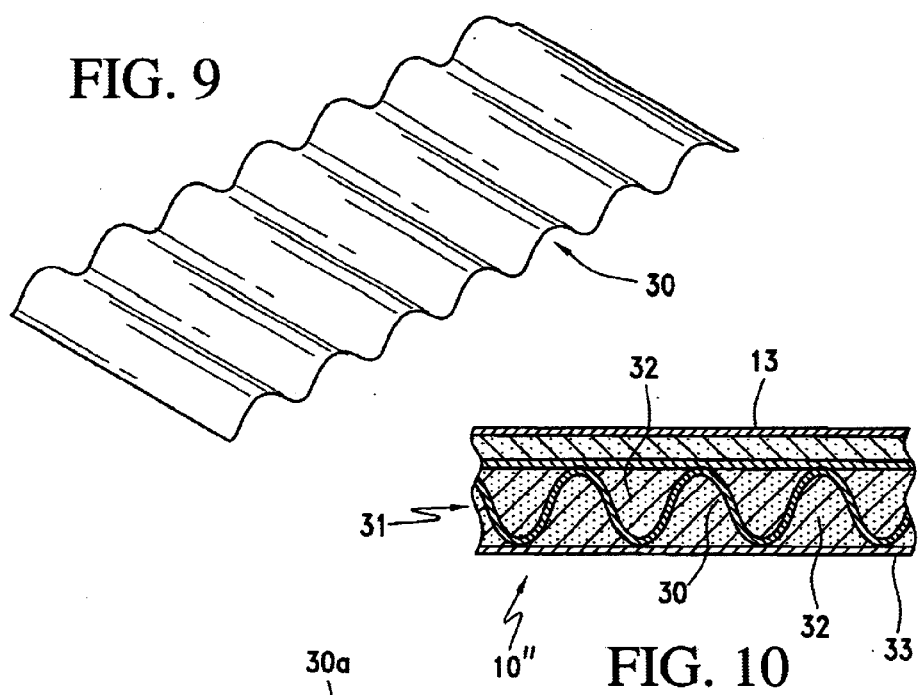
FIG. 9
FIG. 10
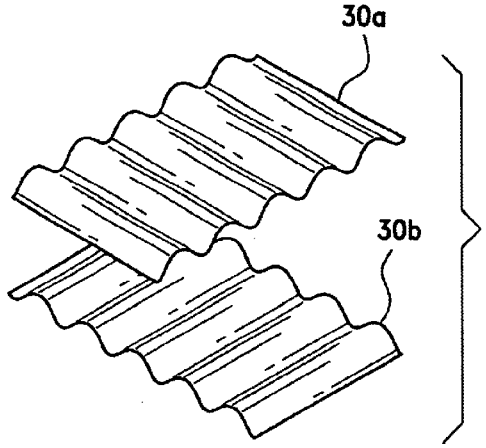
FIG. 11
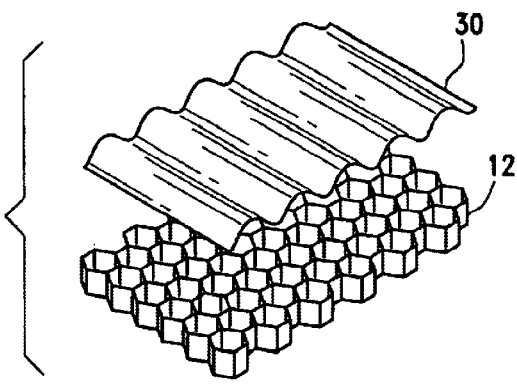
FIG. 12

LIGHTWEIGHT PANEL CONSTRUCTION

BACKGROUND OF THE INVENTION

1. Field of the Invention

This invention relates generally to building materials. More specifically, the invention relates to a lightweight panel construction that is suitable as a substitute or alternative for conventional gypsum wallboard.

2. Prior Art

The interior framing of residential and commercial buildings is typically covered or finished with sheets of gypsum board, commonly referred to as drywall, wallboard or Sheetrock® (trademark of U.S. Gypsum Company). Conventional gypsum wallboard has a gypsum plaster core faced with sheets of paper, and normally is made in standard size panels with dimensions of 4×8, 4×12 or 4×16 feet, and thicknesses ranging from ⅜ inch up to ¾ inch, although thicknesses as little as ¼ inch can be obtained by special order for specialized use.

Considerable transportation costs, and difficulty in handling and installation are associated with conventional gypsum wallboard because of its density and weight. Moreover, gypsum wallboard is susceptible to moisture damage, and is easily dented or broken if struck near the edges or corners. Further, relatively expensive landfill costs are associated with disposal of conventional gypsum board.

Alternatives to conventional gypsum wallboard have been proposed, including wood particle board, and lightweight materials such as paper fiber, composites of synthetic materials, and/or honeycomb reinforcing structures faced with various materials, including plaster or conventional sheets of gypsum board.

U.S. Pat. No. 3,106,503, for example, discloses a composite wallboard having a paper honeycomb core which can be faced on one or both sides with commercially available conventional sheets of gypsum board. The principal object of this patent is to provide a structural panel that can withstand direct contact with flame, and which may be moisture resistant. Further, a stated object is also to provide a lightweight structural panel that has superior qualities of rigidity and strength. However, commercially available sheets of gypsum board having conventional thickness, i.e., from ⅜ inch up to ¾ inch, are applied to the honeycomb core. The panels described in this patent are therefore relatively heavy and hard to handle in that they still incorporate sheets of gypsum board having conventional thickness, and the composite panel appears to have a total thickness substantially greater than the thickness of conventional gypsum board. Further, manufacture of the panels described in this patent is relatively complicated and expensive.

U.S. Pat. No. 3,170,827 discloses a method of making an insulation panel having facing sheets of asbestos cement board separated by approximately six inches of polyurethane foam reinforced with honeycomb paper. In making the panel, a layer of foam-forming chemicals is deposited on a bottom facing sheet, a honeycomb structure is pressed into the chemical layer into bonding relationship with the bottom facing sheet, the foam is expanded, and a top facing sheet is placed on top of the structure, in contact with the expanded foam, which bonds the components together.

U.S. Pat. No. 3,246,058 discloses a method for producing reinforced foam laminate structures, wherein a reinforcement member, e.g., corrugated material, is fed between two continuously supplied spaced sheets of facing material, at least one of which has been coated with an organic foam material, and the foam is expanded to fill the space and bond the components together.

U.S. Pat. No. 3,249,659 discloses a method of making structural panels useful as walls, partitions, doors, truck bodies and the like, wherein a core is interposed between facing sheets and partially filled with a foamed plastic to form an air space therein. In particular, a layer of foam-forming mixture is applied to the inner surfaces of the facing sheets, a reinforcing member is inserted between the sheets, and the layers of foam-forming mixture are expanded toward one another but without merging. A structure analogous to an I-beam is thus formed.

U.S. Pat. No. 4,351,870 discloses a panel construction especially suitable for earthquake and fire resistance, and adapted for assembly of pre-fabricated components to form a building. The panel includes one or more layers of strength-increasing material separated by lower strength bulk-producing layers which may comprise foamed plastic or foam rubber materials. Facing sheets such as wood veneer, plastic simulated wood veneer, wallpaper finish, brick, tile, or plaster may be used to obtain a desired appearance.

U.S. Pat. No. 4,917,742 discloses a method of making lightweight building panels having a foam-filled honeycomb core faced with fiberglass-reinforced plastic sheets.

U.S. Pat. No. 5,309,690 discloses a lightweight composite panel intended as a substitute for gypsum board. The panel comprises a cellular core filled with an inorganic insulating material and a material which releases water at elevated temperatures, and first and second sheets such as corrugated cardboard bonded to opposite sides of the core.

U.S. Pat. No. 5,338,594 discloses a lightweight insulation and structural material for building and aerospace industries, wherein a honeycomb structure is filled with a polycyanurate foam. The foam is expanded in the honeycomb cells while contained by pressure plates above and below the cells.

U.S. Pat. No. 5,679,433 discloses a non-combustible wall decorating panel having a honeycomb core and a metal foil facing sheet.

Although the prior art discloses a variety of panels, some of which have good strength-to-weight ratios, including panels suitable for use in the building industry, it does not disclose any lightweight and tough panel intended as a substitute for conventional gypsum board wall panels, wherein the substitute panel has the same surface characteristics as conventional gypsum board panels, i.e., it has a surface veneer of paper-covered gypsum plaster, and preferably has the same dimensional relationships, whereby the panel may be installed and finished using conventional techniques and equipment.

Accordingly, there is need for a panel that has the same surface characteristics as a conventional gypsum board, and has the same dimensional relationships, but is substantially lighter in weight while at the same time possessing superior toughness.

SUMMARY OF THE INVENTION

The invention is a composite panel for use in place of conventional gypsum board panels, and that has the same surface characteristics and preferably the same dimensional relationships as a conventional gypsum board panel, but is significantly lighter in weight while at the same time possessing superior toughness.

The panel of the invention is an improvement over conventional drywall or gypsum board primarily because of its greatly reduced density, which results in a weight reduction of sixty or percent or greater, and the benefits associated with this reduced density. These benefits include reduced transportation costs and requirements, reduced labor for handling and installation, less dust and debris when working with the panel, improved workability and elimination or reduction of landfill fees required for disposal, and potentially a reduction of structural members that would otherwise be required in a building simply to support the considerable weight of conventional gypsum board.

The panel of the invention comprises an open cell reinforcing core structure faced with a thin gypsum board veneer, and has a greatly improved strength-to-weight ratio compared with conventional gypsum board panels, especially when it employs a foam-filled core construction, being synergistically stronger than either the open cell core structure or the gypsum board alone.

One open cell core construction suitable for use in the invention is the Hexacomb$_{tm}$ packaging material made by Pactive Corporation (formerly Tenneco). This packaging material is a paper honeycomb structure, and in one embodiment comprises strips of 33 lb. liner glued together at contact lines running in the machine direction. Each strip of core paper is aligned such that the machine direction is in the thickness direction of the core. The primary fibers are thus aligned with the machine direction, resulting in the greatest compression strength and stiffness.

A gypsum board facing sheet or veneer is applied to at least one side of the core, to provide the same surface characteristics and appearance as conventional gypsum board. This facing sheet is only deep or thick enough to obtain these characteristics, i.e., to enable normal working of the panel, namely, sanding, cutting, finishing and acceptance of fasteners, in the same way as obtained with conventional sheets of gypsum board. A suitable thickness for the gypsum facing sheet or veneer would be in the range of from about 1/16 of an inch up to about 1/8 of an inch, or even up to 1/4 of an inch.

For example, to produce a panel having a standard nominal thickness of 1/2 inch, a facing sheet of 1/8 inch thickness could be applied to a honeycomb core having a thickness of 3/8 inch; or, a facing sheet of 1/16 inch thickness could be applied to a honeycomb core having a thickness of 7/16 of an inch; etcetera. Similarly, to produce a panel having a 3/4 inch thickness, the facing sheet could be only 1/8 inch thick, but the core thickness would be increased to 5/8 inch; or alternatively, a thinner facing sheet, e.g., 1/16 inch, could be applied to a core having a thickness of 11/16 of an inch. It should be understood that the gypsum facing sheet could have other thicknesses, as long as it is thick enough to impart the desired surface characteristics to the panel, but not so thick as to unnecessarily increase the weight of the panel. Thickness of from about 1/16 of an inch up to about 1/4 inch, for example, may be suitable.

A panel constructed in accordance with the invention is stronger near the edges and corners than a conventional gypsum board, because the foam-filled core material does not break and crumble near the edges as will conventional gypsum board. It is also anticipated that the installation or addition of electronic circuitry will be easier than with conventional gypsum board. For instance, circuitry can be embedded in the cells of the core, in the facing, or between the cells and facing, which can facilitate construction of the "house of the future". For example, sensors which can track the location of specific objects or persons, monitor and control climate settings, record events, etc., can be incorporated into the structure. Moreover, portions of the core may be left open to provide raceways or channels for utilities or the like.

The core material can be paper-based or other material such as plastic or a composite. If paper-based, the core material can be bleached or unbleached, virgin or recycled, or a combination thereof, and can be impregnated or coated with a suitable resin or other material selected for its desired properties. The core construction can be either honeycomb, corrugated, or laminations of corrugated layers or combinations of corrugated and honeycomb. If a honeycomb core construction is used, the cell size can typically vary from 3/8 inch to 1 inch center-to-center, although other dimensions can be employed. The foam used to fill the core can be a fire rated or fire retardant foam, or a foam having other desirable properties, and can be selected from any of those commercially available, for example.

BRIEF DESCRIPTION OF THE DRAWINGS

The foregoing, as well as other objects and advantages of the invention, will become apparent from the following detailed description when considered in conjunction with the accompanying drawings, wherein like reference characters designate like parts throughout the several views, and wherein:

FIG. 5 is an exploded top perspective view showing the major components, and their arrangement, in a panel according to the invention;

FIG. 6 is a somewhat schematic top perspective view showing strips of paper glued together in the preparation of a honeycomb core material for use in the invention;

FIG. 7 is a top perspective view of the secured-together strips of paper after the cells are expanded in the "x" and "y" directions;

FIG. 8 depicts a strip of paper with the fibers aligned in the machine direction;

FIG. 9 is a top perspective view of a piece of corrugated material which may be used to form the open cell reinforcing structure in the panel of the invention;

FIG. 10 is an enlarged transverse sectional view of a portion of a panel according to the invention, showing a corrugated open cell reinforcing core structure faced with a gypsum board veneer and wherein the cells of the core are filled with an expanded foam;

FIG. 11 is an exploded perspective view showing a plurality of sheets of corrugated material that may be laminated together to form the open cell reinforcing core in the panel of the invention; and FIG. 12 is an exploded perspective view showing a plurality of layers or laminations of corrugated and honeycomb material disposed in another possible arrangement for forming the reinforcing core.

DETAILED DESCRIPTION OF THE PREFERRED EMBODIMENTS

Referring more specifically to the drawings, a lightweight panel in accordance with the invention is indicated generally at 10 in FIGS. 1–5.

Figure 1:
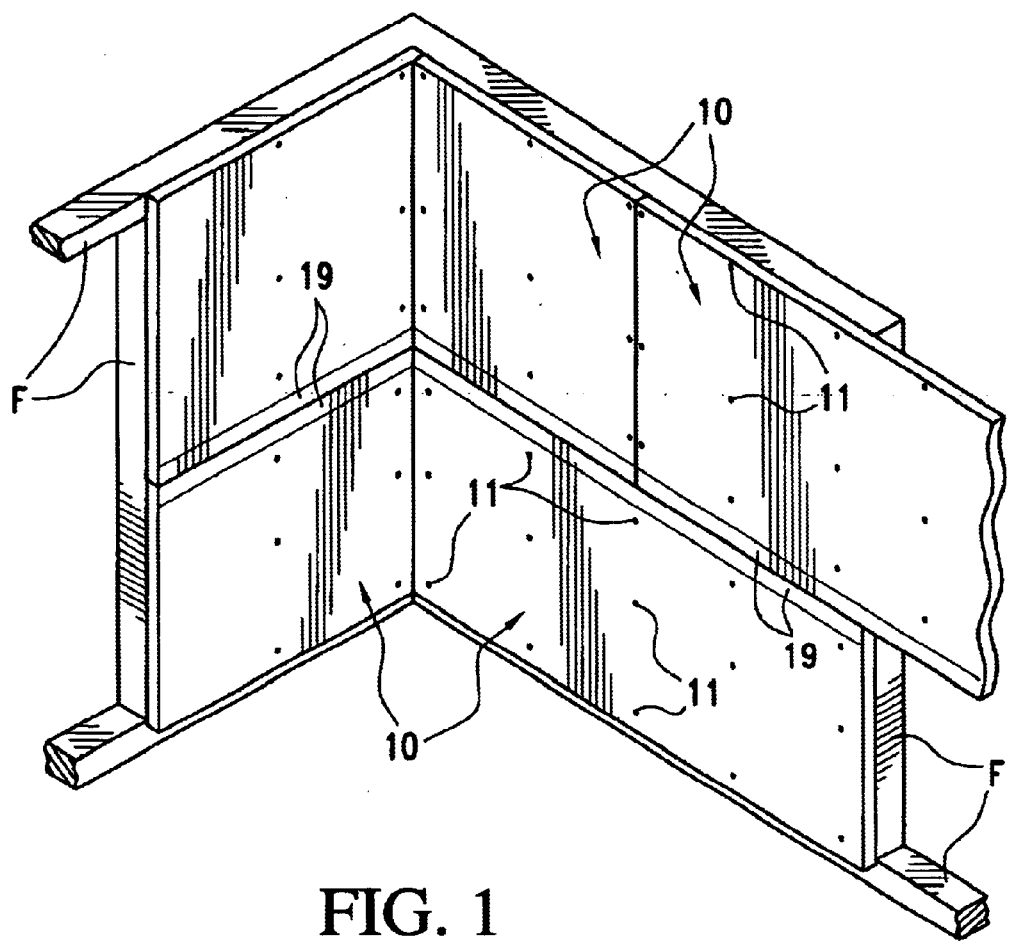
FIG. 1 is a top perspective view showing panels according to the invention installed in place on a wall frame structure.

In FIG. 1 a plurality of panels 10 are shown secured in a conventional manner to a frame structure F, i.e., the panels are attached or "hung" in the usual manner, typically with the long dimension extending horizontally and with joints offset. Screws or other suitable fasteners 11 are extended through the panels into the frame. In this regard, the panels 10 are installed and worked exactly the same way as conventional gypsum wallboard, except that they are much lighter and easier to handle.

Figure 2:
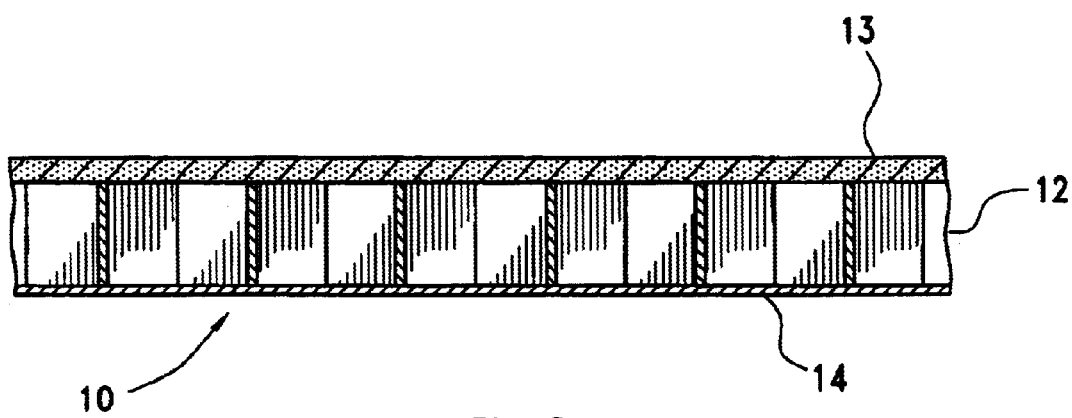
FIG. 2 is a fragmentary, enlarged, transverse sectional view of a panel constructed in accordance with the invention.
Figure 3:
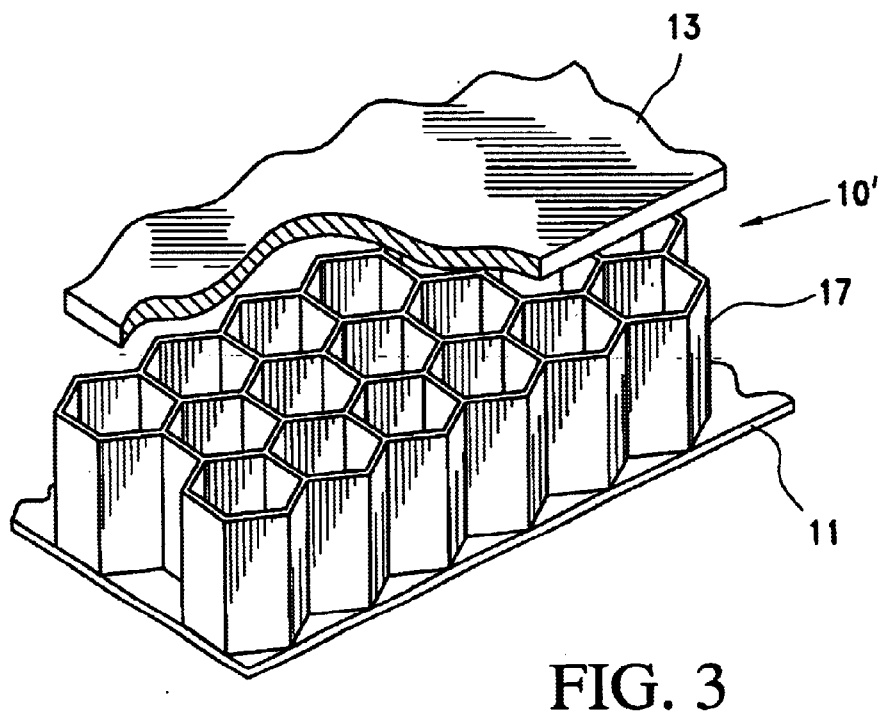
FIG. 3 is an enlarged, fragmentary, top perspective view, with portions broken away, of a portion of a panel in accordance with the invention.
Figure 4:
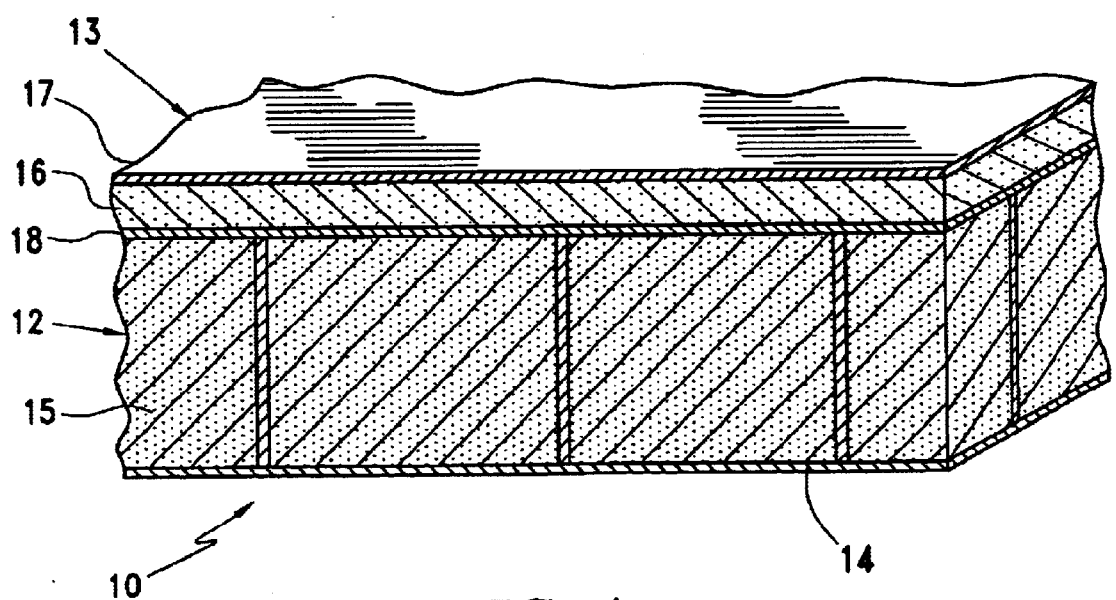
FIG. 4 is a further enlarged, fragmentary perspective view in section of a panel in accordance with the invention.

With particular reference to FIGS. 2–4, the panel 10 comprises a lightweight open cell reinforcing structure 12 having secured on one side thereof a gypsum board facing sheet 13. and on the other side a backing sheet 14. It should be understood that the backing sheet is a sheet of paper, and has negligible thickness with regard to the overall thickness of the panel 10, so the thickness of the backing sheet is not being taken into consideration when discussing the thickness of the panel or core.

In a preferred embodiment, the open cell reinforcing structure comprises a honeycomb core filled with a polyurethane foam 15. The foam adds strength and rigidity to the panel while also serving to permanently bond the components together.

FIG. 3 depicts a form in which the foam is omitted, and the panel 10' comprises just the honeycomb core 12, backing sheet 14 and gypsum facing sheet 13.

The backing sheet 14 and honeycomb core may both be made of paper material, e.g., kraft paper or liner, either bleached or unbleached, and the gypsum board facing sheet 13 may be conventionally constructed except that it is very thin, e.g., on the order of $1/16$ to $1/4$ of an inch thick. Thus, as shown in FIG. 4, the gypsum board facing sheet has a gypsum plaster core 16 between paper skins 17 and 18. Additionally, the long side edges of the sheet 13 may be slightly tapered on the face of the sheet as indicated at 19 in FIG. 1 to facilitate taping and hiding the joint between adjacent panels, just as in a conventional gypsum board. Further, the thickness of the facing sheet 13 is just sufficient to enable the fasteners 11 to dimple the surface of the sheet, leaving a shallow depression that can be filled with joint compound during finishing of the wall surface, thereby hiding the fasteners and providing a smooth surface.

The panel 10 may be made in standard sizes, e.g., 4×8 feet, 4×12 feet, or 4×16 feet, with thicknesses ranging from $3/8$ of an inch up to $3/4$ of an inch or greater. In each instance, the facing sheet 13 of gypsum board is only thick enough to provide the appearance and surface characteristics of a conventional gypsum board, e.g., about $1/16$ to $1/4$ of an inch thick. Thus, for example, for a panel 10 having an overall thickness of $3/8$ of an inch, and a facing sheet of gypsum board having a thickness of $1/16$ of an inch, the core would have a thickness of about $5/16$ of an inch. For a panel having an overall thickness of $3/4$ of an inch, and a facing sheet having a thickness of $1/16$ of an inch, the core would have a thickness of about $11/16$ of an inch.

The use of a very thin gypsum board facing sheet on a reinforcing core or backing provides a very lightweight and strong panel that has the same appearance and workability as a conventional gypsum board, but is substantially lighter and easier to handle.

The panel may be manufactured in a variety of ways. According to one way, shown in FIG. 5, a thin layer 20 of foamable material is laid on top of backing sheet 14. A honeycomb structure 12 is then pressed into the layer of foamable material, and a facing sheet 13 of very thin gypsum board is placed on top of the honeycomb structure. The foamable material is then caused to expand, filling the cells of the honeycomb core and contacting the facing sheet. Upon being cured, the foam bonds all of the components together to form a composite structure having high compressive strength and rigidity. This manufacturing method may be carried out by machine in a continuous process.

FIGS. 6–8 depict one method by which the paper honeycomb core can be made. According to this method, strips 25 of paper are glued together at spaced areas 26 to form a convoluted structure, which is then stretched out primarily in the direction of the arrow 28 to form a plurality of hexagonal cells 29. The paper is arranged so that the principal fibers are parallel to the machine direction MD. The resultant structure has great compressive strength and rigidity.

In a preferred construction, the Hexacomb$_{tm}$ packaging material made by Pactive Corporation is used for the honeycomb core. This material uses 33 lb. paper strips. The cell size of the honeycomb matrix preferably is from $3/8$ of an inch to 1 inch, center-to-center. The thickness varies depending upon the desired finished thickness of the panel.

An alternative material for forming the reinforcing structure is depicted in FIGS. 9 and 10. Rather than the honeycomb structure, a sheet of corrugated material 30 is shown in FIG. 9, and is depicted in FIG. 10 as it might be used in forming an open cell reinforcing core 31, with a gypsum board veneer 13 adhered to one side of the reinforcing core 31 to form a lightweight composite panel 10". FIG. 10 further shows the concave areas on opposite sides of the corrugated material filled with an expanded foam 32, although the foam could be omitted if desired. A backing sheet 33 may cover the side of the panel opposite the gypsum veneer.

Another alternative construction is shown in FIG. 11, wherein plural sheets 30a and 30b of corrugated material are arranged with their respective corrugations extending at a right angle to one another. The sheets of corrugated material may be used with or without an expanded foam filling the spaces in the convolutions of the corrugated material.

A further alternative construction is shown in FIG. 12, wherein a combination of honeycomb 12 and corrugated 30 is laminated to form a reinforcing core. Again, this construction may be used with or without an expanded foam filling the spaces in the core.

While particular embodiments of the invention have been illustrated and described in detail herein, it should be understood that various changes and modifications may be made to the invention without departing from the spirit and intent of the invention as defined by the scope of the appended claims

What is claimed is:

1. A lightweight panel construction for use as a facing panel on an existing wall structure in lieu of relatively heavy conventional gypsum board, comprising:

a thin sheet of gypsum board laminated as a facing sheet onto one side of a core of lightweight open cell reinforcing structure to form a lightweight but strong composite panel as a substitute for gypsum board, said thin sheet of gypsum board having a thickness of from about $1/16$ of an inch up to abut $1/4$ of an inch, sufficient only to present an appearance and surface characteristics like that of a conventional sheet of gypsum board;

wherein the open cell reinforcing structure comprises a lamination formed of alternate layers of honeycomb and corrugated material.

2. A panel construction as claimed in claim 1, wherein:

said sheet of gypsum board has a thickness of about 1/8 of an inch, and the core has a thickness of about 1/4 of an inch, whereby the composite panel has a thickness of about 3/8 of an inch.

3. A panel construction as claimed in claim 1, wherein:

said sheet of gypsum board has thickness of about 1/16 of an inch, and the core has thickness of about 11/16 of an inch, whereby the composite panel has a thickness of about 3/4 of an inch.

4. A panel construction as claimed in claim 1, wherein:

said sheet of gypsum board has a thickness of about 1/16 of an inch, and the core has a thickness of about 5/16 of an inch, whereby the composite panel has a thickness of about 3/8 of an inch.

5. A panel construction as claimed in claim 1, wherein:

the honeycomb structure comprises structure with hexagonally shaped cells.

6. A wallboard construction as claimed in claim 5, wherein: the honeycomb structure is made of a paper material.

7. A panel construction as claimed in claim 6, wherein:

the cell of the honeycomb structure is made of a paper material.

8. A panel construction as a lightweight substitute for conventional gypsum board, constructed and adapted for use as a facing sheet on an existing wall structure, comprising a lightweight, open cell reinforcing core structure covered on one side with a thin veneer of gypsum board to form a lightweight but strong composite panel that is a substitute for conventional gypsum board, said veneer of gypsum board having a thickness sufficient only to emulate the surface of a conventional sheet of gypsum board;

wherein the thin veneer of gypsum board has a first thickness and the reinforcing structure has a second thickness greater than the first thickness;

wherein the thin veneer of gypsum board is provided on only one side of the lightweight cor, and a sheet of backing paper is applied to the other side of the core.

9. A panel construction as claimed in claim 8, wherein:

the open cell reinforcing structured is filled with an expanded foam material.

10. A panel construction as claimed in claim 8, wherein:

raceways or channels for utilities or the like are formed in the open cell reinforcing structure.

11. A panel construction as claimed in claim 8, wherein:

the open cell reinforcing structure comprises a lamination of plural layers of corrugated material arranged with the convolution thereof extending at a right angle to one another.

12. A panel construction as claimed in claim 8, wherein:

said veneer of gypsum board has a thickness of from about 1/16 of an inch up to about 1/4 of an inch.

13. A panel construction as claimed in claim 8, wherein:

the open cell reinforcing structure comprises a honeycomb configuration with hexagonally shaped cells.

14. A panel construction as claimed in claim 13, wherein:

the cells of the honeycomb are filled with an expanded foam material.

* * * * *